US011586537B2

(12) United States Patent
Chaffin et al.

(10) Patent No.: US 11,586,537 B2
(45) Date of Patent: Feb. 21, 2023

(54) METHOD, APPARATUS, AND SYSTEM FOR RUN-TIME CHECKING OF MEMORY TAGS IN A PROCESSOR-BASED SYSTEM

(71) Applicant: Ampere Computing LLC, Santa Clara, CA (US)

(72) Inventors: Benjamin Crawford Chaffin, Portland, OR (US); Bret Leslie Toll, Santa Clara, CA (US); Jonathan Christopher Perry, Portland, OR (US); Nagi Aboulenein, King City, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/393,715

(22) Filed: Aug. 4, 2021

(65) Prior Publication Data

US 2022/0043748 A1 Feb. 10, 2022

Related U.S. Application Data

(60) Provisional application No. 63/060,898, filed on Aug. 4, 2020, provisional application No. 63/060,906, filed on Aug. 4, 2020.

(51) Int. Cl.
 *G06F 12/00* (2006.01)
 *G06F 12/0802* (2016.01)

(52) U.S. Cl.
 CPC ...... *G06F 12/0802* (2013.01); *G06F 2212/72* (2013.01)

(58) Field of Classification Search
 CPC ............ G06F 12/0802; G06F 12/0862; G06F 2212/72; G06F 2212/602; G06F 2212/6022
 See application file for complete search history.

(56) References Cited

U.S. PATENT DOCUMENTS 7,177,985 B1 2/2007 Diefendorff
2014/0297965 A1* 10/2014 Jayaseelan .......... G06F 12/0862
 711/137

(Continued)

OTHER PUBLICATIONS

International Search Report and Written Opinion for International Patent Application No. PCT/US2021/044493, dated Nov. 18, 2021, 14 pages.

(Continued)

*Primary Examiner* — Shawn X Gu
(74) *Attorney, Agent, or Firm* — Withrow & Terranova, PLLC

(57) ABSTRACT

A data processing system includes a store datapath configured to perform tag checking in a store operation to a store address associated with a cache line in a memory. The store datapath includes a cache lookup circuit configured to pre-load a store cache line that is to be updated in the store operation, wherein the store cache line comprises the cache line in the memory to be updated in the store operation. The store datapath also includes a tag check circuit configured to compare a store address tag associated with the store address to a store operation tag associated with the store operation. The data processing system may include a load datapath configured to perform tag checking in a load operation from a load cache line in the memory by comparing a load address tag associated with the load address to a load operation tag associated with the load operation.

33 Claims, 5 Drawing Sheets

(56) References Cited

U.S. PATENT DOCUMENTS

2015/0378901 A1* 12/2015 Bradbury ............ G06F 12/0897
711/122
2019/0377580 A1 12/2019 Vorbach et al.

OTHER PUBLICATIONS

Written Opinion for International Patent Application No. PCT/US2021/044493, dated Jul. 11, 2022, 8 pages.
International Preliminary Report on Patentability for International Patent Application No. PCT/US2021/044493, dated Sep. 29, 2022, 9 pages.

* cited by examiner

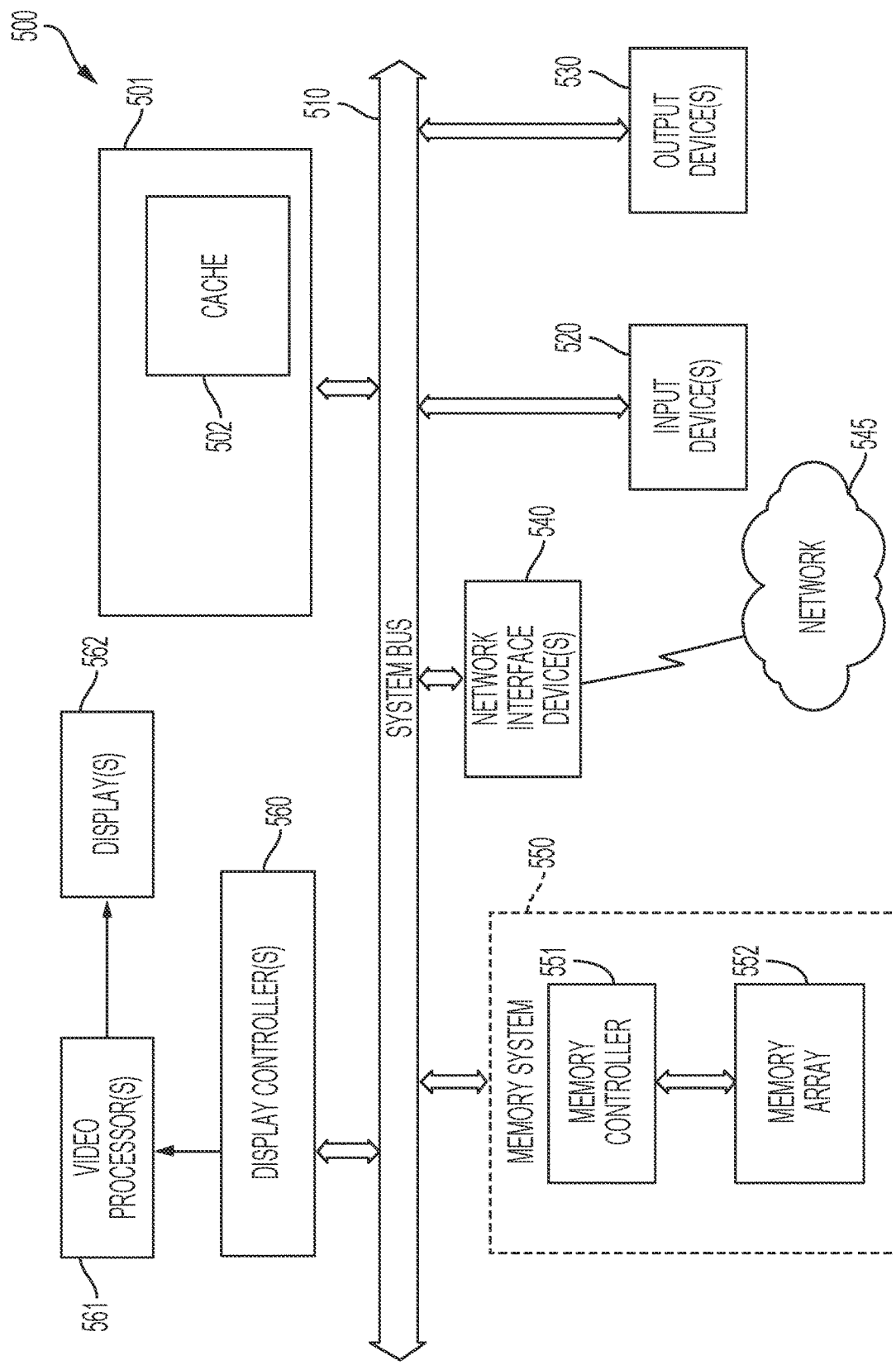

METHOD, APPARATUS, AND SYSTEM FOR RUN-TIME CHECKING OF MEMORY TAGS IN A PROCESSOR-BASED SYSTEM

PRIORITY APPLICATIONS

The present application claims priority under 35 U.S.C. § 119(e) to U.S. Provisional Patent Application Ser. No. 63/060,906, filed Aug. 4, 2020, and entitled "METHOD, APPARATUS, AND SYSTEM FOR RUN-TIME CHECKING OF MEMORY TAGS" and to U.S. Provisional Patent Application Ser. No. 63/060,898, filed Aug. 4, 2020, and entitled "METHOD, APPARATUS, AND SYSTEM FOR RETRIEVAL OF MEMORY TAGS," which are incorporated herein by reference in their entirety.

BACKGROUND

I. Field of the Disclosure

The technology of the disclosure relates generally to memory tagging, and specifically to performing run-time checking of memory tags.

II. Background

Microprocessors may conventionally execute code which involves access to a memory by the microprocessor. As part of such access, the code may be permitted to perform pointer arithmetic. A pointer is a memory address pointing to a specific memory location or block of memory. Conventionally, pointer arithmetic may not be checked during production run-time to verify that such pointer arithmetic stays within expected memory ranges. This can result in, for example, failing to recognize and respond to difficult-to-identify software bugs which manifest as sporadic (i.e., difficult to replicate) crashes, or unobserved data corruption. Additionally, in recent years, several hacking exploits and memory-safety bugs have attempted to take advantage of pointer arithmetic not being verified during production run-time in order to allow unintended or malicious code to be executed on the microprocessor. Particularly in applications where the microprocessor is working on sensitive data, this creates a security issue, and may result in loss or theft of proprietary data and code, among other things, if such malicious code is permitted to execute on the processor.

One known approach to addressing the debugging and malicious code problems described above is memory tagging. Memory tagging (also sometimes referred to as memory coloring) associates a tag with each allocation of memory, such that adjacent tagged blocks of memory have different tags (colors). All accesses to the allocated memory are by virtue of a pointer including the matching tag for verification. An attempt to access a memory location in memory for which the tag does not match indicates that either an error has occurred, or malicious or unintended code behavior may be present, and an operating system or hypervisor may take action based on the mismatch (such as reporting back to the user, flagging a process which attempted the access, etc.), while disallowing the access to the memory location for which the tag did not match.

While memory tagging can address some of the problems described above, conventional implementations of memory tagging also impose costs on a system which implements it. Extra physical storage is consumed because associating the tags with memory allocations means that the tags must be stored in scarce physical storage resources that can be accessed for comparison to a pointer tag. Those resources then cannot be used for program code or data. Further, in order to perform tag checking, a processor must retrieve the associated tags, which consumes more memory bus bandwidth. This may result in unacceptable performance degradation in production run-time environments, especially where memory operations such as loads and stores are concerned. In some architectures, the performance degradation may be particularly acute when performing store operations because there is an architectural requirement of delaying the commit of stores until the data is written into the cache and the tag information is available. Suspending further operation until the tag can be checked may impose significant delays. Therefore, it would be desirable to develop an implementation of memory tagging that retains the security and debugging benefits, while mitigating the performance and other penalties associating with performing memory tagging.

SUMMARY OF THE DISCLOSURE

Aspects disclosed in the detailed description include a method, apparatus, and system for run-time checking of memory tags in a processor-based system. Run-time memory tag checking in a store operation in a data processing system without a reduction in performance includes pre-loading data into a cache line associated with a store address that is to be updated by the store operation before the store operation is committed. A data word pre-loaded in the cache line includes a metadata field including an address tag corresponding to a chunk of data in the data word at the store address. The address tag is compared to an operation tag associated with the store operation to a store address calculated by pointer arithmetic in the data processing system. In response to determining that the address tag does not match the operation tag, the store operation may not be completed. In another aspect, run-time memory tag checking in a load operation in a data processing system includes accessing data and an address tag associated with a load address of associated with a cache line in a memory and comparing the address tag to an operation tag associated with the load operation. A data word in a cache line includes a metadata field including the memory tag, which corresponds to a chunk of data in the data word. In response to determining that the address tag does not match the operation tag, the load operation may not be completed.

In this regard in one aspect, an exemplary data processing system comprising a store datapath circuit is disclosed. The store datapath is configured to pre-load a store cache line comprising a cache line in a memory to be updated in a store operation. The store datapath is configured to compare a store address tag associated with a store address to a store operation tag associated with the store operation.

In another aspect, an exemplary method of performing tag checking in a data processing system is disclosed. The method includes pre-loading a store cache line comprising a cache line in a memory to be updated in a store operation, and comparing a store address tag associated with a store address to a store operation tag associated with the store operation.

In another aspect, an exemplary non-transitory computer-readable medium comprising instructions is disclosed. The instructions, when executed by a processor, cause the processor to pre-load a store cache line comprising a cache line in a memory to be updated in a store operation, and compare a store address tag associated with a store address to a store operation tag associated with the store operation.

In another aspect, a data processing system, comprising a store datapath circuit is disclosed. The data processing circuit comprises a means for pre-loading a store cache line comprising a cache line in a memory to be updated in a store operation and a means for comparing a store address tag associated with a store address to a store operation tag associated with the store operation.

BRIEF DESCRIPTION OF THE FIGURES

FIG. 5 is a block diagram of an exemplary processor-based system configured to perform run-time checking of memory tags in a processor-based system.

DETAILED DESCRIPTION

Figure 1:
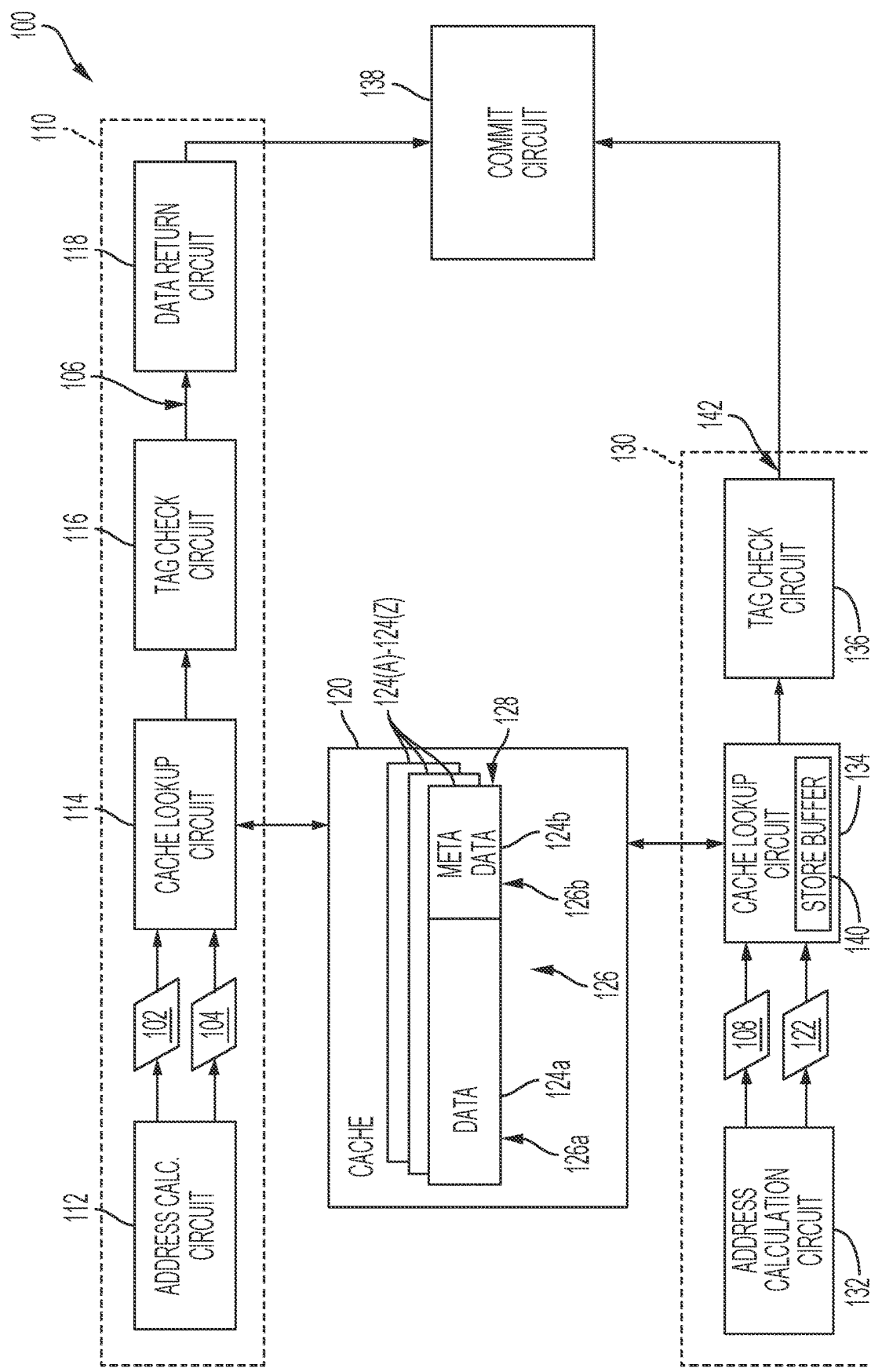
FIG. 1 is a block diagram of a data processing system in a processor-based system configured to perform run-time memory tag checking during store and load operations associated with a cache line in a cache memory.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a method, apparatus, and system for run-time checking of memory tags in a processor-based system. Run-time memory tag checking in a store operation in a data processing system without a reduction in performance includes pre-loading data into a cache line associated with a store address that is to be updated by the store operation before the store operation is committed. A data word pre-loaded in the cache line includes a metadata field including an address tag corresponding to a chunk of data in the data word at the store address. The address tag is compared to an operation tag associated with the store operation to a store address calculated by pointer arithmetic in the data processing system. In response to determining that the address tag does not match the operation tag, the store operation may not be completed. In another aspect, run-time memory tag checking in a load operation in a data processing system includes accessing data and an address tag associated with a load address associated with a cache line in a memory and comparing the address tag to an operation tag associated with the load operation. A data word in a cache line includes a metadata field including the memory tag, which corresponds to a chunk of data in the data word. In response to determining that the address tag does not match the operation tag, the load operation may not be completed.

In this regard, FIG. 1 is a block diagram of a data processing system 100, discussed in more detail below, configured to perform run-time checking of memory tags ("memory tag checking") in load operations and store operations associated with a cache memory 120, which may also be referred to herein as "cache 120" or "memory 120". The data processing system 100 includes a load data path 110 configured to perform load operations and a store data path 130 configured to perform store operations. A load operation may load data associated with a load address into a register in a processor in the data processing system 100, for example. The data may be loaded from the cache memory 120 if a valid copy of the data is stored in one of a plurality of cache lines 124(A)-124(Z) in the cache memory 120. Otherwise, the data may be retrieved from a higher level cache or a memory (e.g., external memory) (not shown). A store operation may store data associated with a store address into one of the plurality of cache lines 124(A)-124(Z) in the cache memory 120. Alternatively, a store operation may write to a copy of the data stored at a higher cache level or memory (not shown). Writing data in a store operation may include writing data into all or a select set of bytes in a data word, to update the data word. It should be noted that the cache memory 120 is not limited to the plurality of cache lines 124(A)-124(Z) (i.e., not limited to 26 cache lines), which is used herein as an example only.

The load datapath 110 and the store datapath 130 are both coupled to the cache memory 120 and converge at a commit circuit 138. plurality of cache lines 124(A)-124(Z) may each be formatted to store a data word 126. Each cache line 124 of the plurality of cache lines 124(A)-124(Z) includes a data portion 124*a* and a metadata portion 124*b* to store data 126*a* and metadata 126*b*, respectively. The metadata portion 124*b* may contain tag information 128, which may also be referred to herein as a memory tag 128, associated with the data 126*a* in the data portion 124*a*. The memory tag 128 may be associated with a block or chunk of data in the data word 126 that is stored in one of the plurality of cache lines 124(A)-124(Z). One of the plurality of cache lines 124(A)-124(Z) associated with a load operation may be referred to herein as a load cache line 124.

In one example, the data portion 124*a* may store up to sixty-four (64) bytes of data, which corresponds to four (4) sixteen-byte (16-byte) chunks and the data portion 124*b* may store a separate memory tag 128 for each of the chunks. In another example, one memory tag 128 may correspond to the entire data word 126 stored in one of the plurality of cache lines 124(A)-124(Z). The data portion 124*a* in the load cache line 124 may store any number of bytes. It should be understood that a data portion 124*a* of 64 bytes referred to herein is just an example.

The load datapath 110 (also referred to as the load datapath circuit 110) in FIG. 1 includes an address calculation circuit 112, a cache lookup circuit 114, a tag check circuit 116, and a data return circuit 118. For the load datapath 110 to perform memory tag checking with minimal performance impact (e.g., during run-time) to a load operation, the metadata 126*b* (e.g., including the tag information 128) continues to be associated with the data word 126 throughout all parts of the load operation. In this regard, the data 126*a* and the metadata 126*b* are stored in the cache line 124 (e.g., load cache line 124) of the plurality of cache lines 124(A)-124(Z) in the cache memory 120 associated with the load address 102. The address calculation circuit 112 calculates a load address 102 that points to the target memory address of a load operation. The address calculation circuit 112 may also provide a load operation tag 104 associated with the load operation to the cache lookup circuit 114, which then passes the load operation tag 104 to the tag check circuit 116. The address calculation circuit 112 may also provide the load operation tag 104 directly to the tag check circuit 116.

The cache lookup circuit 114 included in the load datapath 110 may include extra datapath width to account for the metadata 126b being moved with the data 126a in a load operation. The cache lookup circuit 114 reads the data 126a and the memory tag 128 from the one of the plurality of cache lines 124(A)-124(Z) associated with the load address 102 and provides the memory tag 128 to the tag check circuit 116.

The tag check circuit 116 performs the memory tag checking ("tag checking") in the load datapath 110, which includes confirming that the load operation tag 104 associated with the load operation matches with the memory tag 128 (e.g., a load address tag 128) in the metadata portion 124b in the one of the plurality of cache lines 124(A)-124(Z) associated with the load address 102. The tag check circuit 116 may perform the tag checking of a first chunk of the data 126a as the load datapath 110 operates on other portions of the data 126a. For example, the tag check circuit 116 may compare the load operation tag to the load address tag to determine whether they match while the data is being aligned for the load operation and/or while using associated error correction code (ECC) bits to check for errors in the data 126a read from the cache memory 120. In this regard, the tag check circuit 116 in which tag checking is enabled may not add delay, such as additional clock cycles, to the time for completing a load operation compared to tag checking being not enabled. The tag check circuit 116 generates an indication 106 to indicate that the load operation tag 104 matches the load address tag 128 or that the load operation tag 104 does not match the load address tag 128.

The load datapath 110 also includes the data return circuit 118, which performs the operation of loading the data 126a that is read from the load cache line 124. As noted above, a load operation may include, for example, after the data 126a is aligned as needed and checked for errors, loading the data 126a into a register (not shown) in the data processing system 100. The tag check circuit 116 provides the indication 106 to the data return circuit 118. If memory tag checking is enabled, the data return circuit 118 may perform the load operation in response to the indication 106 from the tag check circuit 116 indicating that the load operation tag 104 matches the load address tag 128, and does not perform the load operation in response to the indication 106 from the tag check circuit 116 indicating that the load operation tag 104 does not match the load address tag 128.

The store datapath 130 (also referred to as store datapath circuit 130) includes an address calculation circuit 132, a cache lookup circuit 134, and a tag check circuit 136. The address calculation circuit 132 performs the task of calculating the store address 108, which is a pointer to the memory address that will be written to or updated by the store operation. The store address 108 is associated with the one of the plurality of cache lines 124(A)-124(Z) associated with the store address 108 in the cache memory 120. With reference to a store operation, the one of the plurality of cache lines 124(A)-124(Z) that will be updated by the store operation may be referred to as a store cache line 124. A store operation may write to all or only some of the bytes of data 126a stored in the store cache line 124. When the data bytes are written, the data 126a in the store cache line 124 may be considered to be updated by the store operation (e.g., updated with respect to instructions immediately prior to the store operation).

In a conventional store datapath (not shown), a cache lookup circuit may determine whether there is or is not a cache line in the cache memory containing data associated with the store address of a store operation. If the data is not in the cache memory, such cache lookup circuit may initiate a memory operation that may copy the data at the store address (e.g., from an external memory) to an upper level cache memory farther from a processing circuit than the cache memory 120. Then, once the store operation is committed, the store operation may update the data associated with the store address in the upper level cache memory. If there is a cache line in the cache memory containing data associated with the store address, the store operation will write data associated with the store address into the cache memory (i.e., to update the data) after the store operation is committed.

In contrast, the exemplary cache lookup circuit 134 performs operations that support memory tag checking by pre-loading the data 126a into the cache memory 120 before the store operation is committed. The address calculation circuit 132 calculates the store address 108 for the store operation and provides the store address 108 and a store operation tag 122 to the cache lookup circuit 134. The store operation tag 122 includes tag information associated with the store operation to the store address 108. In an example, the store operation tag 122 may be allocated by a memory system to the store address 108 and is used for checking the store operation. The cache lookup circuit 134 determines whether data 126a associated with the store address is already stored in the store cache line 124 in the cache memory 120.

In a first case, the cache lookup circuit 134 determines that the data 126a associated with the store address 108 is stored in the cache memory 120. In this case, the one of the plurality of cache lines 124(A)-124(Z) storing the data 126a associated with the store address 108 may be referred to as the store cache line 124, which is to be updated by the store operation. In response to determining that the data associated with the store address 108 is stored in the cache memory 120, the cache lookup circuit 134 reads the metadata 126b including the memory tag 128 from the store cache line 124. With reference to a store operation, the memory tag 128 may be referred to as a store address tag 128. The cache lookup circuit 134 provides the store address tag 128 to the tag check circuit 136. The tag check circuit 136 compares the store address tag 128 associated with the store address 108 (e.g., from the metadata 126b) to the store operation tag 122 associated with the store operation (e.g., provided by the address calculation circuit 132, which may be via the cache lookup circuit 134). Based on the comparison, the tag check circuit 136 generates an indication 142 indicating that the store address tag 128 matches the store operation tag 122 or indicating that the store address tag 128 does not match the store operation tag 122. The indication 142 is used by the data return circuit 118 to determine whether to complete the store operation when the store operation commits.

In a second case, the cache lookup circuit 134 determines that the plurality of cache lines 124(A)-124(Z) in the cache memory 120 do not contain the data 126a and metadata 126b associated with the store address 108 for the store operation. However, the store address tag 128 in the metadata 126b associated with the store address 108 is needed to perform a comparison to the store operation tag 122. In an exemplary aspect, to avoid an increase in the latency of the store operation, the store datapath 130 does not wait until the store operation commits before retrieving the data word 126 at the store address 108 (e.g., in external memory or a higher level cache) and storing the data word 126 into the one of the plurality of cache lines 124(A)-124(Z) associated with the store address 108 in the cache memory 120. In other words, in response to determining the data 126a associated with the store address 108 is not stored in any of the plurality of cache lines 124(A)-124(Z) in the cache memory 120, the cache lookup circuit 134 pre-loads the store cache line 124 in the cache memory 120 with the data 126a and the metadata 126b associated with the store address 108 before the store cache line 124 is updated by the store operation. In a single read operation of the store address 108, the data word 126 including both of the data 126a and the metadata 126b, including the store address tag 128 associated with the store address 108, is copied into the cache lookup circuit 134 for storage in the cache memory 120. In this case, the store cache line 124 is the cache line 124 in which the data word 126 at the store address 108 is cached. The pre-loading will be performed by the cache lookup circuit 134 after the address calculation circuit 132 has calculated the store address 108 for the store operation. In other words, the store datapath pre-loads the data 126a associated with the store address 108 into the store cache line 124 by reading the data 126a at the store address 108 from an external memory or from a higher-level cache and writing a copy of the (unupdated) data 126a into the store cache line 124 before the store operation commits.

To support the memory tag checking disclosed herein, the higher-level caches and external memory also store the memory tag 128 in the metadata 126b. In response to pre-loading the store address tag 128 associated with the store address 108 in the store cache line 124, the cache lookup circuit 134 may provide the store address tag 128 to the tag check circuit 136. Thus, the store address tag 128 can be compared to the store operation tag 122 in the tag check circuit 136 in advance of actually committing the store operation. As a result, there is minimal or no impact to performance if such memory tag checking is enabled during run-time.

The data processing system 100 includes the commit circuit 138 coupled to the load datapath 110 and the store datapath 130. In response to receiving an indication 142 that the store address tag 128 does not match the store operation tag 122 from the tag check circuit 136, the commit circuit 138 does not complete the store operation to update the store cache line 124. In other words, if the store operation tag 122 provided for the store operation does not match the tag information 128 in the metadata portion 124b of the one of the plurality of store cache lines 124(A)-124(Z) associated with the store address 108, the store operation may not be completed.

Alternatively, in response to receiving the indication 142 that the store address tag 128 matches the store operation tag 122, the commit circuit 138 completes the store operation to update the store cache line 124. Performing memory tag checking for store operations in this way allows much of the latency previously associated with store operations and tag comparisons to be hidden and makes it possible to enable memory tagging for run-time production code with relatively low impact to performance of the data processing system.

A store buffer 140 may be included to track and maintain information regarding all store operations that are pending. The information maintained by the store buffer 140 may include the store address 108, the data 126a, and the tag information 128 that is associated with the store operation. When the data word 126 is copied into the cache lookup circuit 134 in a single read operation, the data word 126, including the data 126a and the metadata 126b may be copied into the store buffer 140. In this manner, data 126a and tag information 128 that are pre-loaded by the cache lookup circuit 134 in a store operation may be immediately stored in the store cache line 124 or the pre-loaded data 126a and metadata 126b may be held in the store buffer 140 where the data 126a is updated based on the store operation. In one example, the store cache line 124 is pre-loaded and, in response to the store operation being committed and the indication 142 that the store address tag 128 matches the store operation tag 122, the store operation is completed by updating the store cache line 124. Alternatively, if the cache lookup circuit 134 includes the store buffer 140, the commit circuit 138 may update the data 126a associated with the store address 108 in the store buffer 140 based on the store operation before the store cache line 124 is pre-loaded. Then, in response to the store operation being committed and the indication 142 that the store address tag 128 matches the store operation tag 122, the updated data 126a in the store buffer 140 is written to the store cache line 124.

In another exemplary aspect, the portions of the load datapath 110 and the store datapath 130 that are used for memory tag checking may be enabled or disabled, based on whether memory tag checking of a particular code segment or program is desired. Thus, for applications which do not benefit from either the enhanced debugging capabilities or security that memory tagging provides, the performance impact of memory tagging may be minimized.

Furthermore, those having skill in the art will recognize that the store datapath 130 may be further optimized to minimize the performance impact when memory tagging is enabled. For example, when data associated with a store is pre-loaded, the store may either be re-submitted to the "normal" store datapath 130, or the data may be provided directly (e.g., by a forwarding network or other similar structure). Stores could further be checked against external snoop operations.

Loads may be checked against pending stores to see if an "older" store operation is pending to a requested load address. Conventionally, in order to avoid a performance loss caused by stalling the load operation until the store has completed, the data associated with the pending store would be forwarded to the load. However, permitting direct forwarding in a system which implements memory tagging may be problematic, as the store operation tag is available, but the store address tag may not have been obtained, so memory tag checking has not yet been formed for the store operation. In this case, the load operation tag may be compared against the store operation tag, and if those tags do not match, store forwarding is disabled. Although this means that in the case of a tag mismatch that the performance benefits of store forwarding will not be realized, in operation this will not result in significant performance degradation. This is because, in the case where the store operation tag and the load operations tags match but the store address's tag does not match the store operation's tag, the store operation will fail, and a fault will be generated. In the case where the store operation tag and the load operation tags do not match, at least one of those tags will cause a fault. Thus, the described aspect maintains most of the benefit of store forwarding, while retaining the security and debugging benefits of memory tagging.

Figure 2:
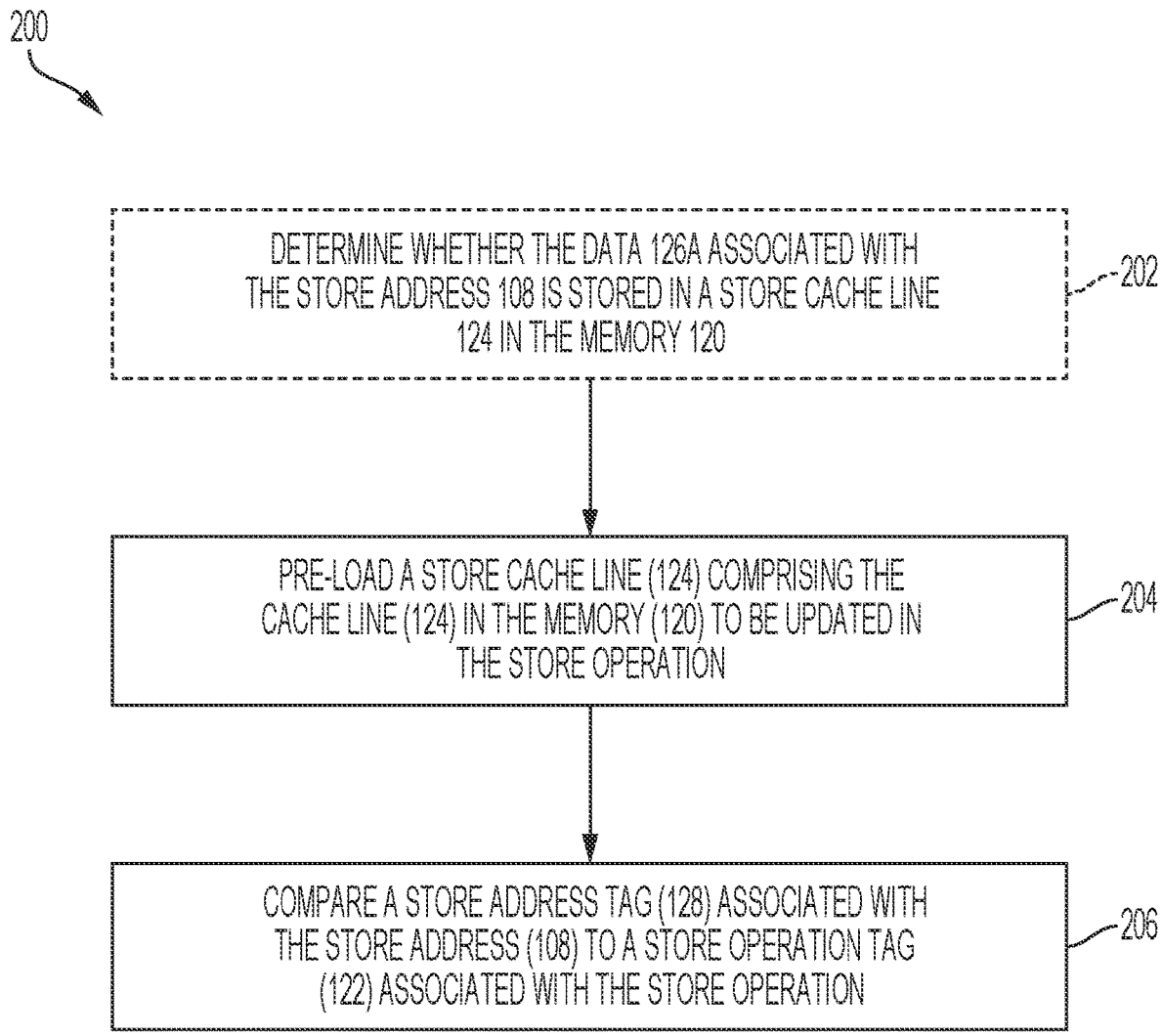
FIG. 2 is a flow chart of performing tag checking during a store operation associated with a cache line in a cache memory.

FIG. 2 is a flow chart illustrating a method 200 in the data processing system 100 of performing memory tag checking in a store operation to a cache line in a memory associated with a store address with minimal, if any, performance impact. The method optionally includes determining whether the data 126a associated with the store address 108 is stored in a store cache line 124 in the memory 120 (block 202). The method includes pre-loading a store cache line 124 comprising the cache line 124 in the memory 120 to be updated in the store operation (block 204). The method includes comparing a store address tag 128 associated with the store address 108 to a store operation tag 122 associated with the store operation (block 206).

Figure 3:
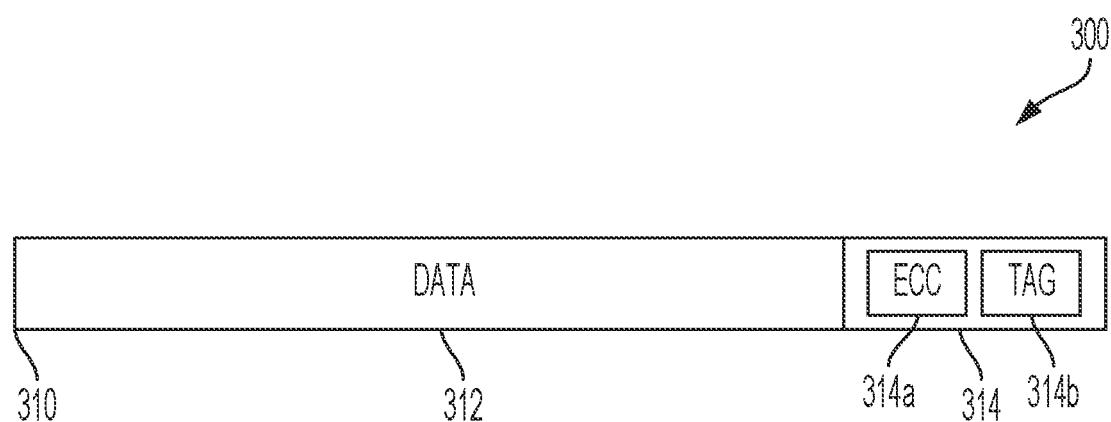
FIG. 3 is a block diagram of a dynamic random-access memory (DRAM) data word including metadata including error correction code (ECC) and tag information.

FIG. 3 is a block diagram 300 of a dynamic random-access memory (DRAM) data word 310 in a format corresponding to the cache line 124 in FIG. 1, including a data portion 312, and a metadata portion 314, which may be retrieved and stored as an atomic unit. A discussion of the DRAM data word 310 is included for a better understanding of ways in which the exemplary data processing system 100 can perform run-time memory tag checking with little or no performance degradation. In particular, because the metadata portion 314 is retrieved along with the data portion 312 when the DRAM data word 310 is accessed, the tag information stored in the metadata portion 314 may be retrieved without the need for additional memory accesses being performed.

As an example, the metadata portion 314 may include ECC bits 314a. Depending on a level of ECC implemented, the data processing system 100 may provide detection of some number of errors in the DRAM data word 310 and may also allow for correction of some number of errors. Since no particular level of ECC is required by, for example, a DRAM specification (such as DDR4) that the DRAM data word 310 complies with, the number of bits of the ECC bits 314a in the metadata portion 314 may be reduced. For example, by changing the ECC algorithm associated with the DRAM data word 310, (i.e., to one that requires fewer ECC bits than the conventional ECC algorithm), a different number of bits the ECC bits 314a are stored in the metadata portion 314. Thus, the remaining bits of the metadata portion 314 are available to store other information, including the memory tag 314b. In this manner, the metadata portion 314 may also include a memory tag 314b. Since a number of bits of the memory tag 314b may vary, as discussed above, the data processing system 100 may be adjusted to a desirable compromise of ECC checking and memory tag granularity. The total number of ECC bits 314a and memory tag 314b is less than or equal to the number of bits of the metadata portion 314. The metadata portion 314 will be retrieved along with the data portion 312 for every access to the DRAM data word 310. Thus, whenever the DRAM data word 310 is retrieved, both the ECC bits 314a and the memory tag 314b are retrieved without any additional memory accesses being performed, which may allow the data processing circuit 100 in FIG. 1 to make use of the memory tag 314b to perform memory tag checking for debugging operations and security checks without a performance impact that would be incurred by a conventional manner of storing memory tags separate from the data (e.g., such as in a separate memory location that must be retrieved in addition to the data access).

Those having skill in the art will recognize that the tradeoff between the number of ECC bits and the number of tag bits is a matter of engineering choice. Different systems may have different use cases or requirements, and thus may choose between greater levels of ECC (i.e., greater numbers of detectable and correctable errors), and greater granularity of memory tags. All of these differing implementations are within the scope of the teachings of the present disclosure. Further, the relationship between the tag and the data may be a design choice based on different architectural requirements, available storage, and similar factors. For example, some architectures may specify that each tag is associated with a 16-byte chunk of data, so that a 64-byte DRAM word would store 4 separate tags in the associated metadata portion (one for each 16-byte chunk). However, other granularities of association between a tag and a particular size of a memory chunk are possible and are specifically within the teachings of the present disclosure.

Figure 4:
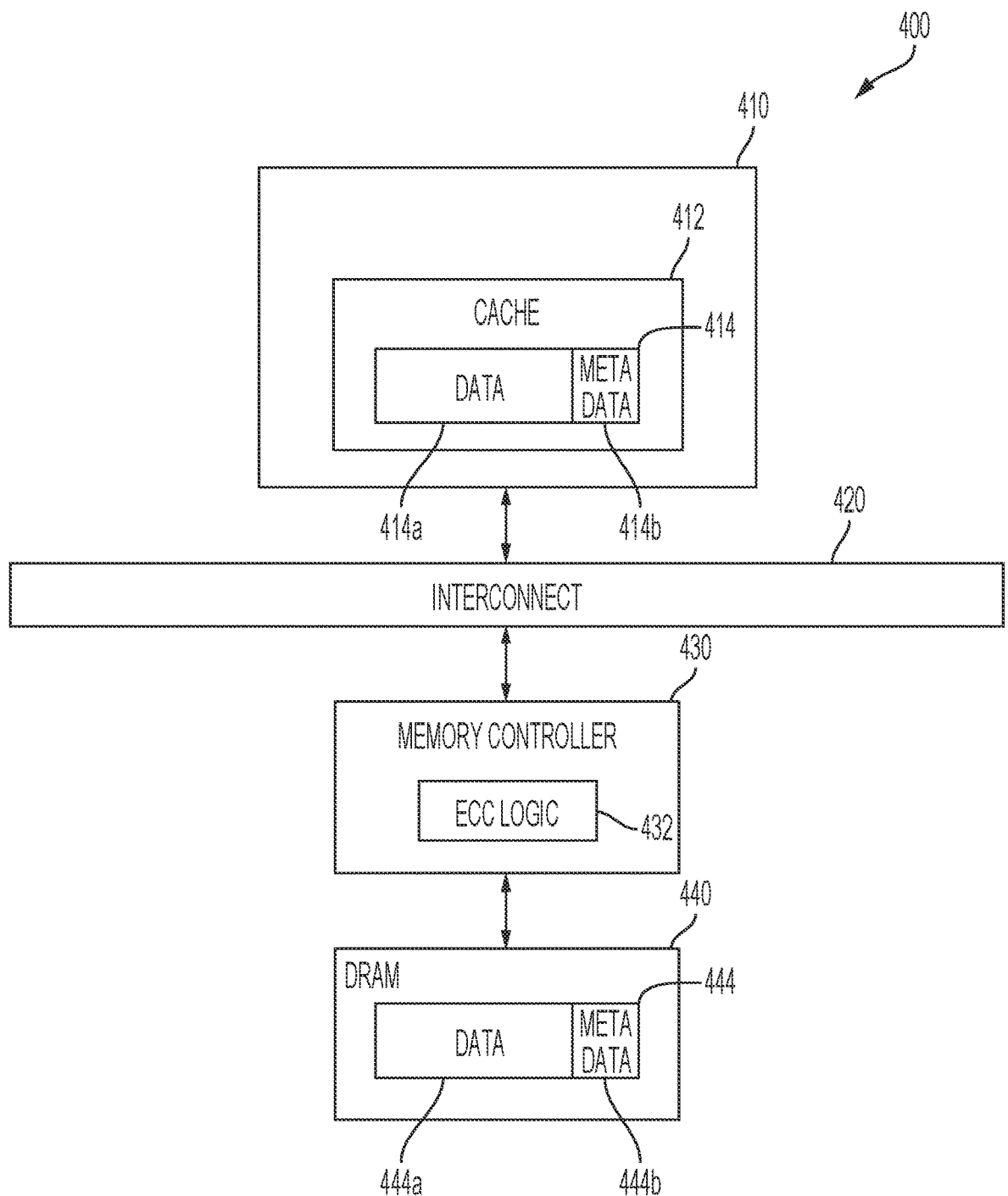
FIG. 4 is a block diagram of a system including the data processing circuit configured to perform memory tag checking and a DRAM memory for storage and retrieval of tag information stored with a data word.

FIG. 4 is a block diagram of a system 400 including a processor core 410 that may correspond to the data processing circuit 100 in FIG. 1. The processor core 410 comprises a cache memory 412 ("cache 412") having a plurality of cache lines such as cache line 414. The cache memory 412 may correspond to the cache memory 120 in FIG. 1 and have the format of the DRAM data word 310 in FIG. 3. The processor core 410 is coupled to a memory controller 430 through an interconnect circuit 420 ("interconnect 420"). The processor core 410 is configured to perform memory transactions with a DRAM 440 via the interconnect circuit 420 and the memory controller 430. Although the system has been illustrated with a single processor core, interconnect, memory controller, and DRAM, this is merely for purposes of illustration, and the teachings of the present disclosure apply similarly to systems with multiple processor core(s), interconnect circuit(s), memory controller(s), and DRAM(s).

In the system 400 of FIG. 4, the DRAM 440 may include a plurality of DRAM data words such as DRAM data word 444, which may be similar to the DRAM data word 310 discussed above in FIG. 3. The DRAM data word 444 may include a data portion 444a and a metadata portion 444b which may include both ECC and tag information. As discussed above with reference to FIG. 3, the system 400 of FIG. 4 employs a level of ECC using an algorithm which does not consume all bits of a metadata portion 444b, leaving room to store a memory tag in the metadata portion 444b. When the processor 410 retrieves a DRAM data word such as DRAM data word 444, both the data portion 444a and the metadata portion 444b (including the ECC and memory tag) are stored in a line of the cache memory 412 such as cache line 414. For example, the data portion 444a may be stored in the data portion 414a of cache line 414, and the metadata portion 444b may be stored in the metadata portion 414b of cache line 414.

In order to support the changed ECC algorithm, the memory controller 430 may include an ECC logic circuit 432, which implements the specific ECC algorithm chosen for the system 400. Although the ECC logic circuit 432 has been illustrated as part of the memory controller, those having skill in the art will recognize that ECC decoding and encoding could be done before or after the memory controller as well, and the specific placement of the ECC logic circuit 432 is a matter of design choice.

Although the present system for storage and retrieval of memory tag information has been discussed in the context of Double Data Rate (DDR) DRAM, the teachings of the present disclosure are not limited to that storage medium, but may be applied to other storage mediums such as non-volatile memory (NVM), high-bandwidth memory (HBM), and other known storage mediums, as long as those storage mediums provide for storage and retrieval of metadata alongside the data that may be configured as described above with respect to FIG. 3. Likewise, although the extra metadata to be stored as discussed herein comprises memory tags, those having skill in the art will recognize that other types of metadata could be stored in other aspects. Further, although the present system for storage and retrieval of memory tag information has been discussed in the context of an associated metadata area that conventionally store ECC information, those having skill in the art will recognize that other metadata areas that are associated with a memory location could also be used, as long as those metadata areas are retrieved along with a data access to that memory location without performing a memory access operation that does not retrieve data.

The exemplary processor configured to perform run-time checking of memory tags according to aspects disclosed herein may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

In this regard, FIG. 5 illustrates an example of a processor-based system 500 that can perform run-time memory tag checking. In this example, the processor-based system 500 includes a processor 501 including a cache 502. The processor 501 corresponds to the data processing system 100 in FIG. 1 and to the processor core 410 in FIG. 4. The cache 502 corresponds to the cache memory 120 in FIG. 1 and to the cache memory 412 in FIG. 4. The processor 501 is coupled to a system bus 510 and can communicate with other devices by exchanging address, control, and data information over the system bus 510. For example, the processor 501 can communicate bus transaction requests to a memory controller 551 in a memory system 550. The memory controller 551 and the memory array 552 in the memory system 550 correspond to the memory controller 430 and the DRAM 440 in FIG. 4. The processor 501 may include features of the load datapath 110, the store datapath 130, and the cache memory 120 of FIG. 1, and may access data stored in the format of the DRAM data word 310 in FIG. 3 in the memory system 550 to perform run-time memory tag checking in the processor-based system 500. Although not illustrated in FIG. 5, multiple system buses 510 could be provided, wherein each system bus 510 constitutes a different fabric.

Other devices can be connected to the system bus 510. As illustrated in FIG. 5, these devices can include one or more input devices 520, one or more output devices 530, one or more network interface devices 540, and one or more display controllers 560, as examples. The input device(s) 520 can include any type of input device, including, but not limited to, input keys, switches, voice processors, etc. The output device(s) 530 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory array 552.

The processor 501 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. An apparatus, comprising:
   a store datapath comprising a cache lookup circuit and a tag checking circuit and configured to perform a store operation having an associated memory tag;
   the cache lookup circuit configured to pre-load a cache line associated with the store operation to which data will be written; and
   the tag checking circuit configured to check a tag included in the store operation against a tag associated with the cache line in a memory.

2. A method, comprising:
   pre-loading a cache line associated with a store operation to which data will be written and an associated memory tag into a cache; and
   checking a memory tag associated with the store operation against the tag associated with the pre-loaded cache line.

3. A non-transitory computer-readable medium comprising instructions which, when executed by a processor, cause the processor to:
   pre-load a cache line associated with a store operation to which data will be written and an associated memory tag into a cache; and
   check a memory tag associated with the store operation against the tag associated with the pre-loaded cache line.

What is claimed is:

1. A data processing system, comprising a store datapath circuit configured to:
   pre-load a store cache line, the store cache line comprising a cache line in a memory to be updated in a store operation;
   compare a store address tag associated with a store address to a store operation tag associated with the store operation;
   determine whether data associated with the store address is stored in the store cache line in the memory; and
   in response to determining the data associated with the store address is not in the memory, pre-load the store cache line with the data and the store address tag associated with the store address.

2. The data processing system of claim 1, wherein the store datapath circuit is further configured to, in response to determining the data associated with the store address is stored in the memory, read the store address tag from the store cache line in the memory.

3. The data processing system of claim 2, further configured to:
   calculate the store address for the store operation; and
   obtain the store operation tag associated with the store operation.

4. The data processing system of claim 3, further configured to:
   in response to comparing the store address tag to the store operation tag, indicate whether the store address tag matches the store operation tag; and
   not complete the store operation to update the store cache line in response to the indication that the store address tag does not match the store operation tag.

5. The data processing system of claim 4, further configured to:
   complete the store operation to update the store cache line in response to the indication that the store address tag matches the store operation tag.

6. The data processing system of claim 1, further configured to:
   update data in the store cache line in the memory based on the store operation.

7. The data processing system of claim 1, further configured to:
   pre-load data associated with the store address and the store address tag associated with the store address to a store buffer;
   update the data associated with the store address in the store buffer based on the store operation to generate updated store cache line data; and
   write the updated store cache line data to the store cache line.

8. The data processing system of claim 7, wherein:
   the data processing system configured to pre-load data associated with the store address and the store address tag associated with the store address is further configured to read a data word including the data and the store address tag associated with the store address into the store buffer in a read operation.

9. The data processing system of claim 1, further comprising:
   a load datapath configured to:
      access data and a load address tag associated with a load address from a load cache line in a load operation; and
      compare the load address tag to a load operation tag associated with the load operation.

10. The data processing system of claim 9, the load datapath further configured to:
    return the data associated with the load address to complete the load operation in response to the load address tag matching the load operation tag; and
    not return the data associated with the load address in response to the load address tag not matching the load operation tag.

11. The data processing system of claim 1, integrated into an integrated circuit (IC).

12. The data processing system of claim 11, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

13. A method of performing tag checking in a data processing system, comprising:
pre-loading a store cache line comprising a cache line in a memory to be updated in a store operation;
comparing a store address tag associated with a store address to a store operation tag associated with the store operation;
determining whether data associated with the store address is stored in the store cache line in the memory; and
in response to determining the store cache line is not stored in the memory, pre-loading the store cache line with the data and the store address tag associated with the store address.

14. The method of claim 13, further comprising:
in response to determining the data associated with the store address is stored in the memory, reading the store address tag from the store cache line in the memory.

15. The method of claim 14, further comprising:
calculating the store address for the store operation; and
obtaining the store operation tag associated with the store operation.

16. The method of claim 15, further comprising:
indicating whether the store address tag matches the store operation tag; and
not completing the store operation to update the store cache line in response to the indication that the store address tag does not match the store operation tag.

17. The method of claim 16, further comprising:
completing the store operation to update the store cache line in response to the indication that the store address tag matches the store operation tag.

18. The method of claim 13, further comprising:
updating the store cache line in response to the store operation.

19. The method of claim 13, further comprising:
pre-loading data associated with the store address and the store address tag associated with the store address to a store buffer;
updating the data associated with the store address in the store buffer based on the store operation to generate updated store cache line data; and
writing the updated store cache line data to the store cache line.

20. The method of claim 19, wherein:
pre-loading data associated with the store address and the store address tag associated with the store address further comprises reading a data word including the data and the store address tag associated with the store address into the store buffer in a read operation.

21. The method of claim 13, further comprising:
accessing data and a load address tag associated with a load address from a load cache line in a load operation; and
comparing the load address tag to a load operation tag associated with the load operation.

22. The method of claim 21, further comprising:
returning the data associated with the load address to complete the load operation in response to the load address tag matching the load operation tag; and
not returning the data associated with the load address in response to the load address tag not matching the load operation tag.

23. A non-transitory computer-readable medium comprising instructions which, when executed by a processor, cause the processor to:
pre-load a store cache line comprising a cache line in a memory to be updated in a store operation;
compare a store address tag associated with a store address to a store operation tag associated with the store operation;
determine whether data associated with the store address is stored in the store cache line in the memory; and
in response to determining the store cache line is not stored in the memory, pre-load the store cache line with the data and the store address tag associated with the store address.

24. The non-transitory computer-readable medium of claim 23, further causing the processor to:
in response to determining the data associated with the store address is stored in the memory, read the store address tag from the store cache line in the memory.

25. The non-transitory computer-readable medium of claim 24, further causing the processor to:
calculate the store address for the store operation; and
obtain the store operation tag associated with the store operation.

26. The non-transitory computer-readable medium of claim 25, further causing the processor to:
indicate whether the store address tag matches the store operation tag; and
not complete the store operation to update the store cache line in response to the indication that the store address tag does not match the store operation tag.

27. The non-transitory computer-readable medium of claim 26, further causing the processor to:
complete the store operation to update the store cache line in response to the indication that the store address tag matches the store operation tag.

28. The non-transitory computer-readable medium of claim 23, further causing the processor to:
update the store cache line in response to the store operation.

29. The non-transitory computer-readable medium of claim 23, further causing the processor to:
pre-load data associated with the store address and the store address tag associated with the store address to a store buffer;
update the data associated with the store address in the store buffer based on the store operation to generate updated store cache line data; and
write the updated store cache line data to the store cache line.

30. The non-transitory computer-readable medium of claim 29, wherein causing the processor to:
pre-load data associated with the store address and the store address tag associated with the store address further causes the processor to read a data word including the data and store address tag associated with the store address into the store buffer in a read operation.

31. The non-transitory computer-readable medium of claim 29, further causing the processor to:
    access data and a load address tag associated with a load address from a load cache line in a load operation; and
    compare the load address tag to a load operation tag associated with the load operation.

32. The non-transitory computer-readable medium of claim 31, further causing the processor to:
    return the data associated with the load address to complete the load operation in response to the load address tag matching the load operation tag; and
    not return the data associated with the load address in response to the load address tag not matching the load operation tag.

33. A data processing circuit, comprising a store datapath circuit, the data processing circuit comprising:
    a means for pre-loading a store cache line comprising a cache line in a memory to be updated in a store operation;
    a means for comparing a store address tag associated with a store address to a store operation tag associated with the store operation;
    a means for determining whether data associated with the store address is stored in the store cache line in the memory; and
    a means for, in response to determining the store cache line is not stored in the memory, pre-loading the store cache line with the data and the store address tag associated with the store address.

\* \* \* \* \*